(12) United States Patent
Huang et al.

(10) Patent No.: US 6,343,903 B1
(45) Date of Patent: Feb. 5, 2002

(54) TOOL HOLDER OF HOLLOW TAPER SHANK IN TOOL MACHINE

(75) Inventors: Hsiang-Feng Huang, Taichung; Kun-Lung Tsai, Hsinchu; Wei-Jun Lin, Taichung Hsien; Ke-Wu Ou Yang, Taiping, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/499,471

(22) Filed: Feb. 7, 2000

(30) Foreign Application Priority Data

Nov. 3, 1999 (TW) ........................................ 88218673 U

(51) Int. Cl.$^7$ ............................................ B23B 31/107
(52) U.S. Cl. ...................... 409/231; 279/2.23; 279/22; 408/240; 409/234
(58) Field of Search ................. 409/231, 232, 409/234; 408/239 R, 240; 279/2, 23, 22, 30, 79, 87, 905, 2.11, 2.12, 75

(56) References Cited

U.S. PATENT DOCUMENTS

| | | | | |
|---|---|---|---|---|
| 1,864,466 A | * | 6/1932 | Peterson | 279/2.23 |
| 4,932,295 A | * | 6/1990 | Erickson | 82/160 |
| 4,951,578 A | * | 8/1990 | von Haas et al. | 409/231 |
| 5,173,017 A | * | 12/1992 | Oshnock et al. | 408/240 |
| 6,003,416 A | * | 12/1999 | Ando et al. | 279/2.23 |

* cited by examiner

*Primary Examiner*—Daniel W. Howell
(74) *Attorney, Agent, or Firm*—Rabin & Berdo, P.C.

(57) ABSTRACT

A tool holder of the hollow taper shank in a tool machine is disclosed. A resisting block supported by a spring is received within a tool holder. As the short knife is disposed within the tool holder, the elastic force of the spring can be overcome. At first, a plurality of steel balls and a resisting block are pushed inversely until the front edge of an wider portion of the short knife passes through the steel ball. Now, the spring will release the energy from elastic deformation so as to enforce the resisting block to move forwards and outwards so as to return to the original position. Thereby, the knife can be firmly secured.

3 Claims, 5 Drawing Sheets

TOOL HOLDER OF HOLLOW TAPER SHANK IN TOOL MACHINE

BACKGROUND OF THE INVENTION

1. Field of the invention

The present invention relates to a tool holder in an automatic tool change means in a tool machine, and especially to a tool holder of a hollow taper shank in a tool machine.

2. Description of the prior art

In the prior art synthetic tool machine, BT knifes is a primary cutting means. However, due to the improvement of technology and the requirement of high speed rotation, the rotary speed of the primary shaft of a tool machine will improve continuously. The conventional BT knife with lower clamping force is not suitable. In order to prevent the fall of the knife in high speed rotation, a new HSK short knife having two resisting surfaces for improving clamping force is developed, which is so called hollow taper shank system. In order to meet with the polarity of the HSK short knife, the knife storage of the tool machine must be changed for suiting the HSK short knife.

The prior art tool holders have two types for meeting the requirement of the HSK short knife in the tool machine, as shown in FIGS. 5, 6, 7 and 8.

The prior art tool holder of the HSK short knife in FIGS. 5 and 6 is a tool holder using an elastic steel piece. At first, the shape of the elastic steel piece 80 is punched to have a shape matching the inner space of a knife 81. Then, the elastic force of the elastic steel piece 80 serves to prevent the tool holder 82 from falling down. However, such structure has the following defects:

1) The elastic steel piece 80 has an elastic structure. The interior of the knife 81 is a round hole 83. There are only 12 contact points. Moreover, since the elastic force of the elastic steel piece 80 cannot be well controlled, the knife 81 cannot be fixed effectively. Thus, as the knife storage is operated, the knife 81 may possibly release due to the weight thereof to make a hazard.

2) Six piece elastic steel pieces 80 easily have errors from assembly so that the contact points of the steel pieces 80 are not in the same plane so that in operation, the knife 81 is possibly released to induce an accident.

As shown in FIGS. 7 and 8, a means with a spring and four steel balls is illustrated. In this means, the steel balls 90 are ejected by a spring 91 so as to be fixed, however such design has the following defect:

1) The spindle 93 of the knife 92 and the spring seat 94 have a small space. A proper spring 91 is difficult to be found. If it is found, the elastic force is also smaller, so that the clamping force between the spring 91 and the knife 92 is not enough. Thus, the knife easily falls.

2) Since the steel ball seat 95 is necessary to be mounted separately for installing the steel balls 90 onto the spring 91, some inconvenience is induced.

3) Since the volume of the steel ball seat 95 is too large, interruptions will occur with the injecting hole for cutting liquid. Therefore, it is only suitable to be used in a knife 92 without an inject hole.

SUMMARY OF THE INVENTION

Accordingly, the primary object of the present invention is to provide a tool holder of hollow taper shank in a tool machine, wherein as the tool holder receives a knife, steel balls will exert an outward action force from a pushing block and a spring, so that the steel balls formed with an outwards acting force will firmly secure the knife without releasing.

Another object of the present invention is to provide a tool holder of hollow taper shank in tool machine, since the tool holder is installed with a positioning confining block with respect to the knife, thus, the knife only inserts into the tool holder unidirectionally so as to prevent an improper rotation of the knife as it is buckled in the tool holder.

A further object of the present invention is to provide a tool holder of hollow taper shank in tool machine, it can be assembled easily and rapidly for increasing the buckling force to a hollow short knife (for simplifying, it is called as an HSK short knife hereafter).

A yet object of the present invention is to provide a tool holder of hollow taper shank in tool machine. The HSK short knife is installed with an injecting hole for cutting liquid or without an injecting hole.

A tool holder of hollow taper shank in tool machine is disclosed, wherein a resisting block supported by a spring is received with a tool holder. As the short knife is disposed within the tool holder, the elastic force of the spring can be overcome. At first, the plurality of steel balls and the resisting block are pushed inversely until the front edge of a wider portion of the short knife passes through the steel ball. Now, the spring will release the energy of elastic deformation so as to enforce the resisting block to return to the original position forwards and outwards. Thereby, the knife can be firmly secured.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
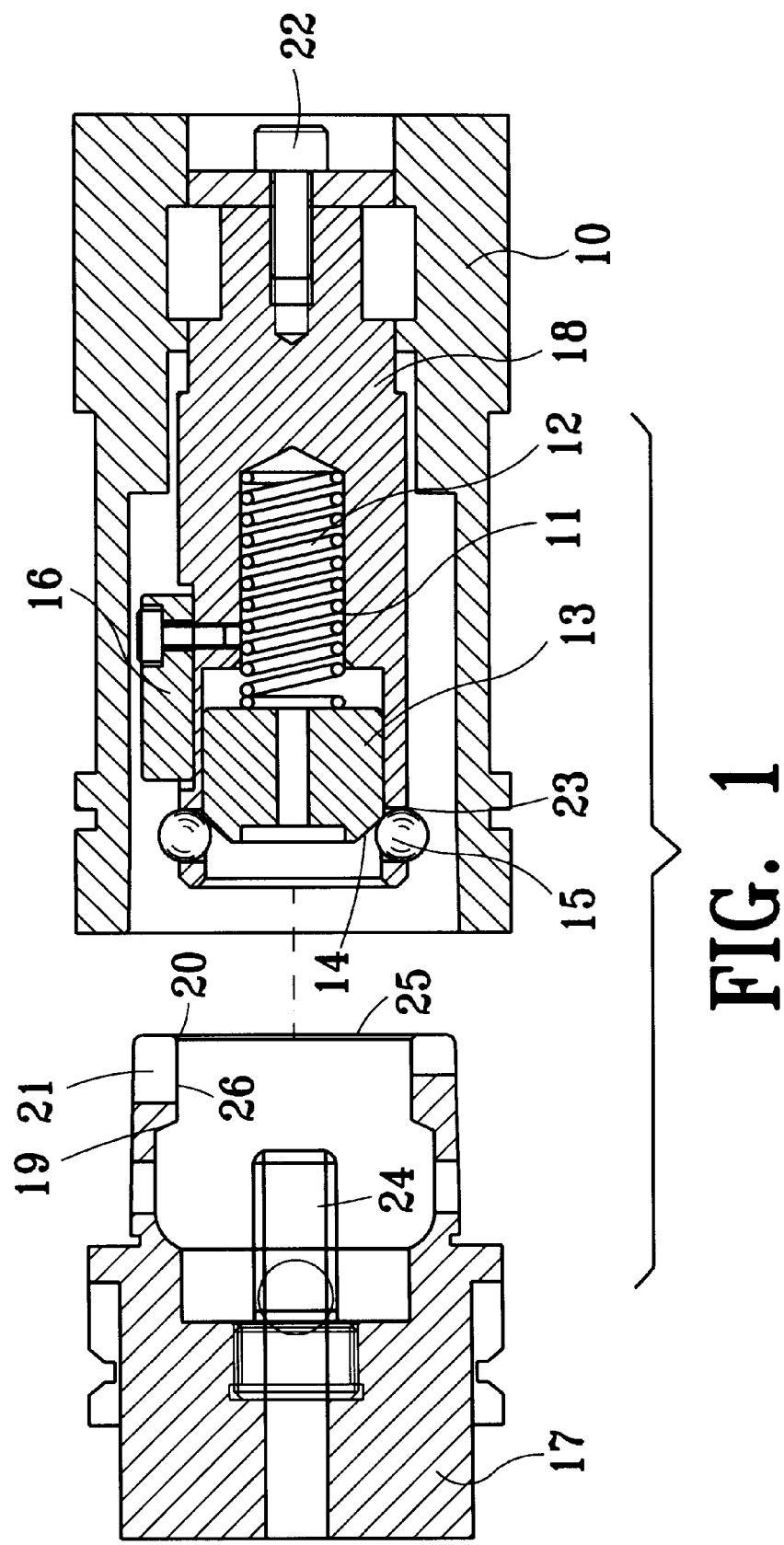
FIG. 1 shows an axial cross sectional view of the tool holder of hollow taper shank in tool machine according to the present invention, wherein the knife has not been inserted into a tool holder.
Figure 2:
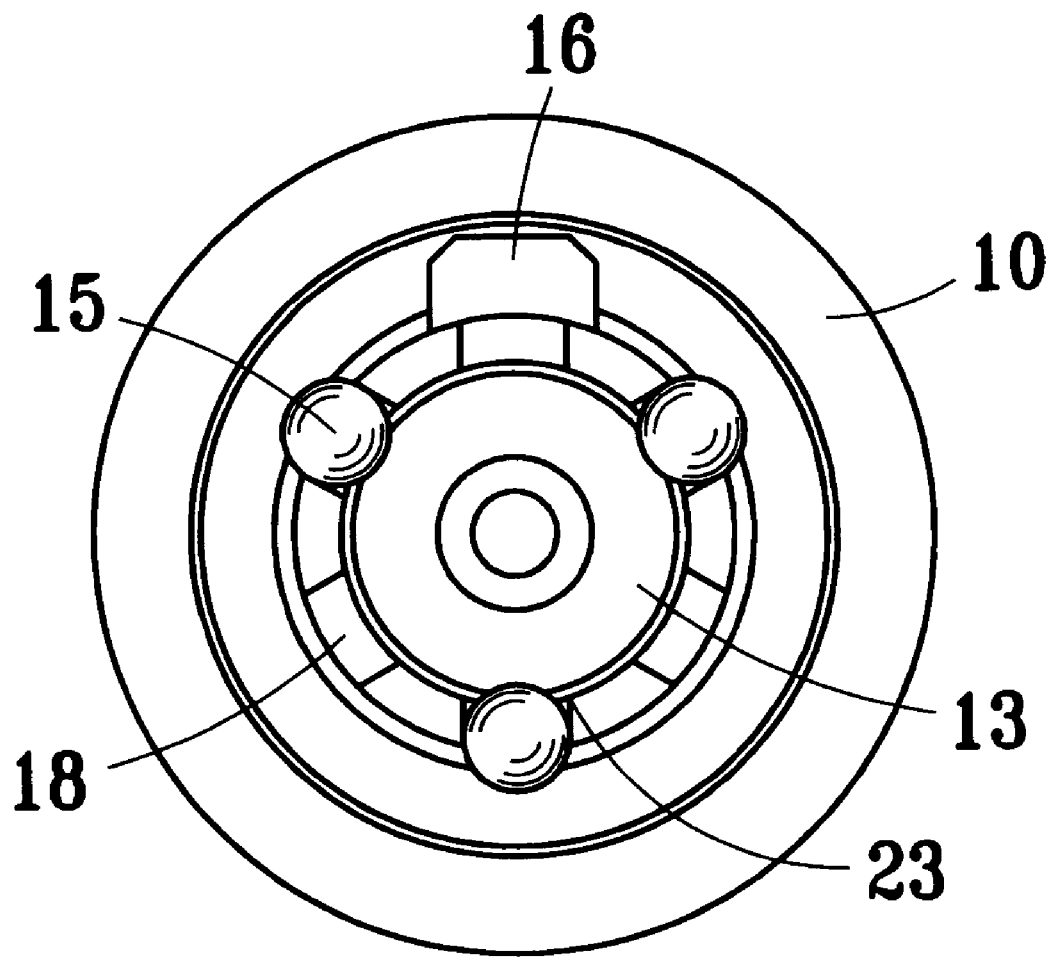
FIG. 2 shows the front view of the tool holder shown in FIG. 1.

With reference to FIGS. 1 and 2, the tool holder of the hollow taper shank in the tool machine of the present invention is illustrated, which is suitable for all kinds of knife storage. In the tool holder, within a hollow tool holder body 10, a fixing combining element 18 is firmly secured thereto by screws 22 or other known fixing elements. A receiving tank (recess) 11 is formed at the center of the combining element 18. An elastic element 12, for example a compressible spring, is disposed within the receiving tank 11. The free end of the elastic element 12 is installed with a resisting block 13 that is movable in the axial direction. By the elastic force of the elastic element 12, it will push outward from the opening of the hollow tool holder 10. The edge of the resisting block 13 is formed with an inward taper surface 14. Besides, a plurality of radial through holes 23 are installed at the combining element 18 in the opening of the receiving tank 1. Each radial through hole 23 exactly receives a steel ball 15 which can move along a radial direction. Each steel ball 15 resists against the inwardly tapering surface 14 of the resisting block 13. Therefore, the resisting block 13 is in a normal position capable of axially pushing toward the combining element 18 by the elastic element 12. Each steel ball 15 will be pushed by the tapered surface 14 of the resisting block 13 so as to radially move outwards and protrude from each radial through hole 13.

The hollow tool holder 10 aforesaid can be steadily buckled to the HSK short knife with an injecting hole of cutting liquid or without any injection hole. The opening 25 thereof has a pushing portion 26 protruding inwards and with a larger width. A first and second tapered surface 19 and 20 are formed at the inner edge and outside of the pushing portion 26.

Figure 3:
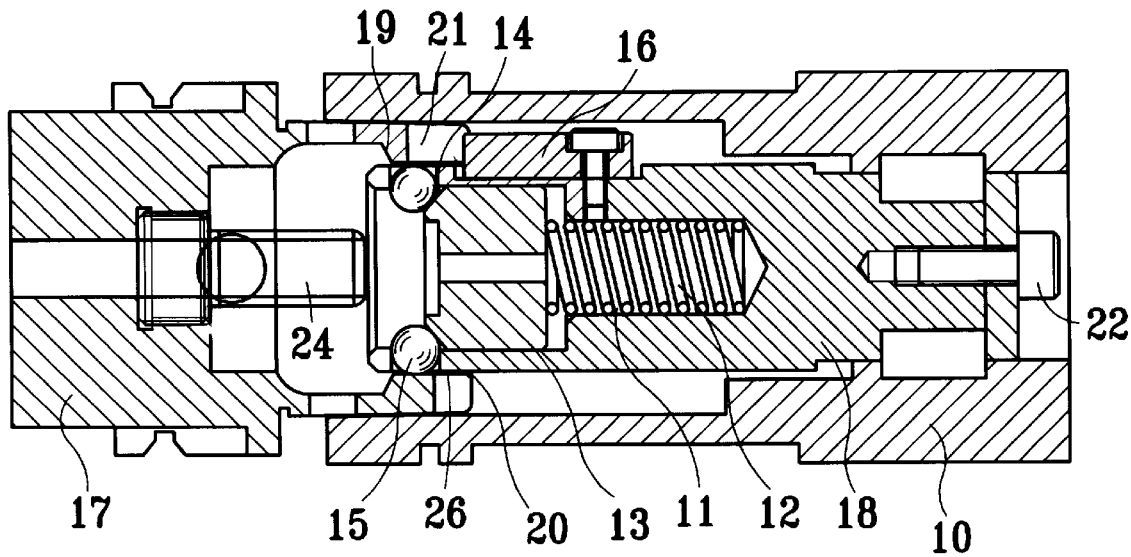
FIG. 3 is similar to FIG. 1, showing an axial cross sectional view with the knife is initially inserted into the tool holder.

As shown in FIG. 3, the specific HSK short knife 17 is inserted into the hollow tool holder 10 by a predetermined way. At first, the second tapered surface 20 at the front edge of the HSK short knife 17 will contact each steel ball 15. By the pushing force of the HSK short knife 17, the wider pushing portion 26 will push the steel balls 15 inwards. The force passes through the steel balls 15 along the tapered surface 14 of the resisting block 13. The resisting block 13 will be driven to overcome the elastic force of the elastic element 12 so as to move reversely, and thus the compressible elastic element 12 will accumulate an elastic deformation.

Figure 4:
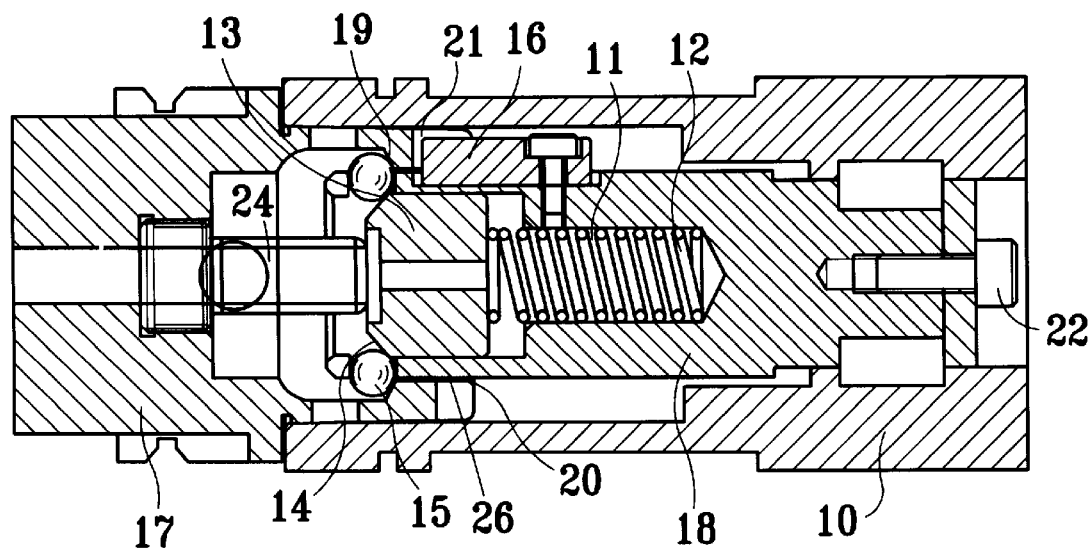
FIG. 4 is similar to FIG. 1, showing an axial cross sectional view with the knife is completely inserted into the tool holder.
Figure 5:
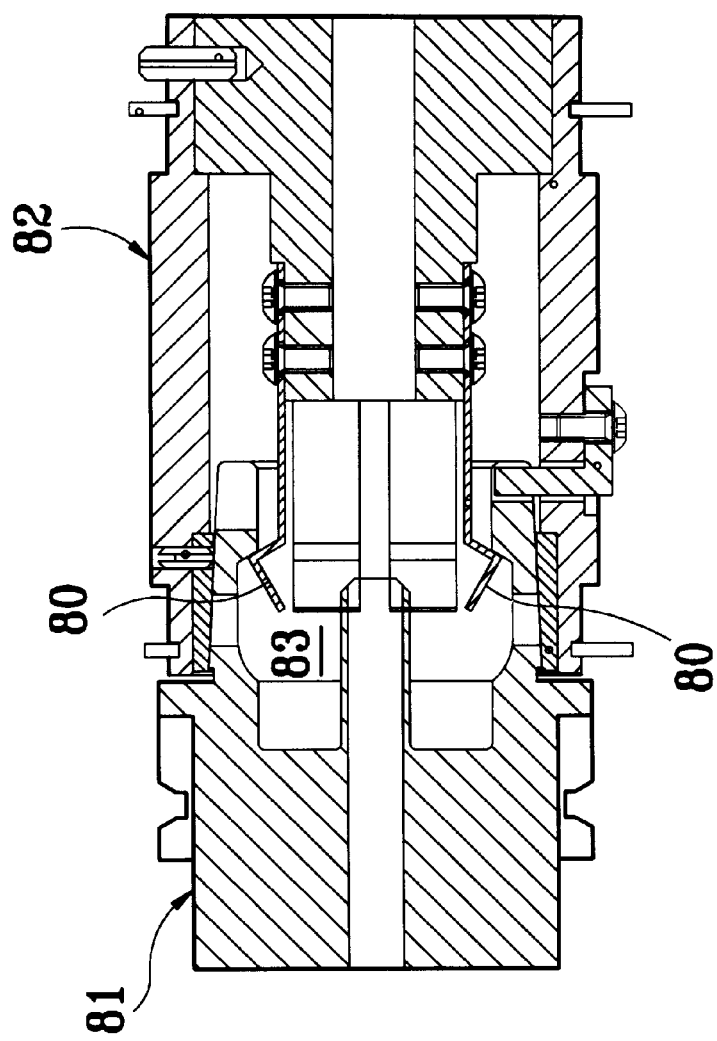
FIG. 5 shows a prior art tool holder of hollow taper shank in tool machine, which is an axial cross sectional view with the knife is completely inserted into the tool holder.
Figure 6:
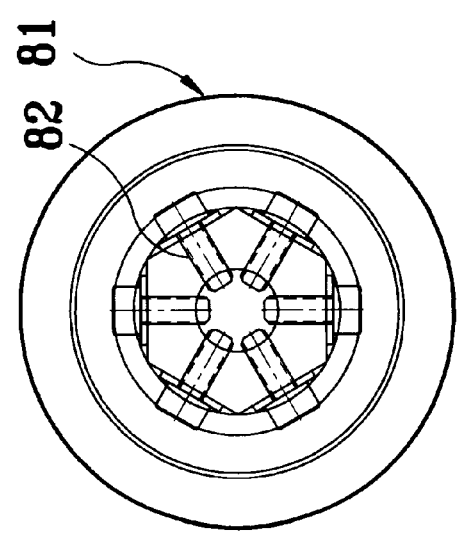
FIG. 6 is a front view showing the tool holder of a prior art elastic steel piece.
Figure 7:
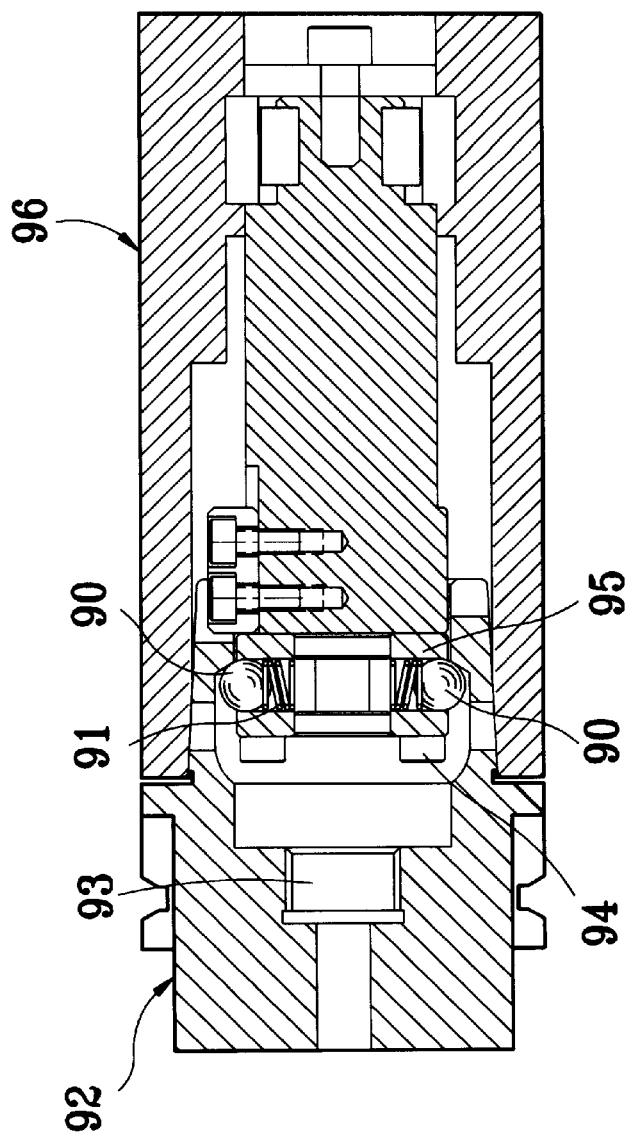
FIG. 7 shows an axial cross sectional view of a prior art steel ball type tool holder of hollow taper shank in tool machine, wherein the knife is completely inserted into the tool holder.
Figure 8:
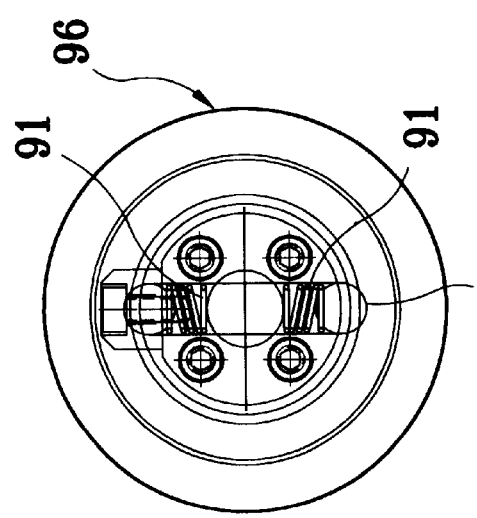
FIG. 8 is a front view showing a prior art steel ball type tool holder of FIG. 7.

As shown in FIG. 4, as the HSK short knife 17 is completely received within the hollow tool holder 10, i.e. the pushing portion 26 completely passes past the steel balls 15. Since each steel ball 15 will not bear the inward force of the pushing portion 26, the elastic element 12 will immediately release the energy of elastic deformation to force each steel ball 15 of the resisting block 13 to return to the normal position as shown in FIG. 4 and to tightly resist against the first tapered surface 19 at the inner side of the HSK short knife 17. By the steel balls 15 applied by elastic force, the HSK short knife 17 can be steadily buckled to prevent that the hollow taper shank 10 from releasing while rotating at a high speed. Especially, as shown in FIG. 4, as the HSK short knife 17 is buckled within the tool holder 10, since the steel balls 15, the HSK short knife 17 and the resisting block 13 are tightly engaged by tapered surfaces, the reverse force the steel balls 15 applied to the HSK short knife 17 will increase with the releasing force of the HSK short knife 17. In other words, as the releasing force becomes larger and larger by the weight of the HSK short knife 17, the reacting force of the steel balls 15 applied to the HSK short knife 17 will also increase. Thus, the present invention has a preferred clamping force to the HSK short knife 17 or other prior art knifes, so as to avoid the release of the HSK short knife 17 while rotating in high speed.

Besides, a positioning confining block 16 is locked to the tool holder 10 at the outside thereof and combined to the combined element 18. The HSK short knife 17 has a long groove 21 matching with the positioning confining block 16 at the opening thereof. As shown in FIG. 4, as the HSK short knife 17 is completely inserted into the tool holder 10, the long groove 21 exactly receives the positioning confining block 16. Therefore, the HSK short knife 17 can only be inserted into the tool holder 10 when it is aligned to the positioning confining block 16; otherwise, the HSK short knife 17 will be hindered by the positioning confining block 16 so that it can not be inserted into the tool holder 10 successfully. This single directional insertion of the positioning confining block will prevent that the HSK short knife 17 from rotating improperly as it is buckled in the tool holder 10. Concurrently, the HSK short knife 17 is suitable to engage with some directional tool head (not shown).

With comparing with the prior art, the tool holder of hollow taper shank in tool machine of the present invention has the following advantages.

1) A plurality of steel balls have an elastic force exerted therein from the outward movement of the resisting block and the elastic member, so that all the steel balls have an outward expanding force. The steel balls and the HSK short knife inserted into the tool holder contact with each other by the tapered surfaces to present a tightening state. Thus, the clamping force of the HSK short knife can be effectively improved. Therefore, the HSK short knife is prevented from releasing.

2) A positioning confining device is installed between the tool holder and the HSK short knife, thus, the HSK short knife is only inserted into the tool holder unidirectionally so as to prevent the knife from rotating improperly as it is buckled in the tool holder.

3) The mounting of the tool holder is easily and rapidly performed, moreover, the buckling force to the HSK short knife can be improved effectively.

4) The structure of the tool holder is suitable for the HSK short knife with an injecting hole for cutting liquid or without any injecting hole.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A tool holder of a hollow taper shank in a tool machine, comprising:

a tool holder body;

a combining element fixed to said tool holder body, and having a receiving recess formed therein, the receiving recess having an opening, said combining element further having a plurality of radial through holes formed at the opening of the receiving recess;

an elastic member disposed within the receiving recess;

a resisting block disposed within the receiving recess and being moveable along an axial direction thereof, said resisting block having a front edge facing the opening, the front edge having an inwardly tapered surface, said resisting block having a rear surface urged by an elastic force of said elastic member toward the opening; and a plurality of steel balls received within the radial through holes, each steel ball resting against the inwardly tapered surface of said resisting block, wherein said elastic member urges said resisting block in a direction extending out of the opening to cause each of said steel balls to be outwardly urged in a radial direction by the inwardly tapered surface.

2. The tool holder recited in claim 1, further comprising a positioning confining block fixed to an outer wall of said combining element, said positioning confining block being adapted to be received within a long groove formed within the hollow taper shank to ensure the hollow taper shank is properly aligned with the tool holder.

3. The tool holder recited in claims 1, wherein said elastic member is a compressible spring.

* * * * *